US011568057B2

(12) United States Patent
Handurukande et al.

(10) Patent No.: US 11,568,057 B2
(45) Date of Patent: Jan. 31, 2023

(54) SYSTEMS AND METHODS FOR TRIAGING SOFTWARE VULNERABILITIES

(71) Applicant: ACCENTURE GLOBAL SOLUTIONS LIMITED, Dublin (IE)

(72) Inventors: Sidath Handurukande, Athlone (IE); Finbarr Tarrant, Dublin (IE); David Glyn Darkin, Dublin (IE); Owen McGauley, Wicklow (IE); Mehdi Sanoh, Dublin (IE); Karel Kohout, Prague (CZ); Richard Levine, Marston Mills, MA (US); Ganesh Devarajan, Hawthorn Woods, IL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 266 days.

(21) Appl. No.: 16/781,160

(22) Filed: Feb. 4, 2020

(65) Prior Publication Data
US 2021/0157926 A1 May 27, 2021

Related U.S. Application Data

(60) Provisional application No. 62/940,941, filed on Nov. 27, 2019.

(51) Int. Cl.
*G06F 21/57* (2013.01)
*G06N 20/20* (2019.01)
*G06N 5/04* (2006.01)

(52) U.S. Cl.
CPC ............ *G06F 21/577* (2013.01); *G06N 5/04* (2013.01); *G06N 20/20* (2019.01); *G06F 2221/034* (2013.01)

(58) Field of Classification Search
CPC ............... G06F 21/577; G06F 21/563; G06F 2221/034; G06F 2221/033; H04L 63/1433;
(Continued)

(56) References Cited

U.S. PATENT DOCUMENTS 9,544,327 B1    1/2017  Sharma et al.
2015/0163242 A1* 6/2015  Laidlaw ............... G06N 7/023
                                                        726/22
(Continued)

OTHER PUBLICATIONS

S. Gowda, D. Prajapati, R. Singh and S. S. Gadre, "False Positive Analysis of Software Vulnerabilities Using Machine Learning," 2018 IEEE International Conference on Cloud Computing in Emerging Markets (CCEM), 2018, pp. 3-6, doi: 10.1109/CCEM.2018.00010. (Year: 2018).*

(Continued)

*Primary Examiner* — Robert B Leung
(74) *Attorney, Agent, or Firm* — Crowell & Moring LLP

(57) ABSTRACT

Systems and methods are provided for the classification of identified security vulnerabilities in software applications, and their automated triage based on machine learning. The disclosed system may generate a report listing detected potential vulnerability issues, and extract features from the report for each potential vulnerability issue. The system may receive policy data and business rules, and compare the extracted features relative to such data and rules. The system may determine a token based on the source code of a potential vulnerability issue, and a vector based on the extracted features of a potential vulnerability issue and based on the token. The system may select a machine learning modelling method and/or an automated triaging method based on the vector, and determine a vulnerability accuracy score based on the vector using the selected method.

17 Claims, 11 Drawing Sheets

(58) Field of Classification Search
CPC .......... G06N 5/04; G06N 5/003; G06N 5/047; G06N 20/20
See application file for complete search history.

(56) References Cited

U.S. PATENT DOCUMENTS

| | | | |
|---|---|---|---|
| 2016/0065599 A1* | 3/2016 | Hovor | G06F 16/338 726/23 |
| 2018/0004948 A1 | 1/2018 | Martin et al. | |
| 2019/0306035 A1 | 10/2019 | Scheib et al. | |
| 2020/0057850 A1 | 2/2020 | Kraus et al. | |

OTHER PUBLICATIONS

G. Jie, K. Xiao-Hui and L. Qiang, "Survey on Software Vulnerability Analysis Method Based on Machine Learning," 2016 IEEE First International Conference on Data Science in Cyberspace (DSC), 2016, pp. 642-647, doi: 10.1109/DSC.2016.33. (Year: 2016).*

R. Scandariato, J. Walden, A. Hovsepyan and W. Joosen, "Predicting Vulnerable Software Components via Text Mining," in IEEE Transactions on Software Engineering, vol. 40, No. 10, pp. 993-1006, Oct. 1, 2014, doi: 10.1109/TSE.2014.2340398. (Year: 2014).*

Ghaffarian SM, Shahriari HR. Software vulnerability analysis and discovery using machine-learning and data-mining techniques: a survey. ACM Computing Surveys (CSUR). Aug. 2, 20175; 50(4):1-36. (Year: 2017).*

Derek D'Souza et al., Tool Evaluation Report: Fortify, Analysis of Software Artifacts, 10 pgs., Apr. 24, 2007. retrieved from internet <URL: https://www.cs.cmu.edu/~aldrich/courses/654/tools/dsouza-fortify-07.pdf>.

Rebecca L. Russell et al., Automated Vulnerability Detection in Source Code Using Deep Representation Learning, 17th IEEE International Conference on Machine Learning and Applications, 7 pgs., Nov. 28, 2018.

Effective Identification of Vulnerabilities Using Machine Learning, 11 pgs., Nov. 2019. retrieved from internet <URL: http://asankhaya.github.io/pdf/Effective-Identification-of-Vulnerabilities-using-Machine-Learning.pdf>.

European Search Report from corresponding European application No. EP 20 20 3539, 10 pp., dated Apr. 1, 2021.

Office Action issued in Indian Application 202044046618 dated Sep. 6, 2021, 7 pages.

* cited by examiner

| Strategy | Assessed for issue type, if, | Viable for issue type, if, | # Assessed | # Viable |
|---|---|---|---|---|
| Filter | • Benchmark Dataset 1 has at least 100 issues<br>• Benchmark Dataset 2 has at least 25 issues | • 99%+ of issues audited as "Not an Issue" in Benchmark Dataset 1<br>• 95%+ of issues audited as "Not an Issue" in Benchmark Dataset 2 | 42 | 5 |
| Blanket Exploitable | • Benchmark Dataset 1 has at least 100 issues<br>• Benchmark Dataset 2 has at least 25 issues | • 95%+ of issues audited as either "Exploitable" or "Suspicious" in Benchmark Dataset 1<br>• 80%+ of issues audited as either "Exploitable" or "Suspicious" in Benchmark Dataset 2 | 42 | 9 |
| Programmed Rule | • Discussed with security analyst (SA) | • Deemed viable by data scientists | 11 | 2 (<50% coverage) |
| ML Model | • Benchmark Dataset 1 has at least 30 issues (15+ labelled Exploitable/Suspicious, and 15+ labelled "Not an Issue")<br>• At least 10 issues in Benchmark Dataset 2 | • For Benchmark Dataset 2 predictions, recall ≥ 95% and precision ≥ 80% | 26 | 4 |
| Audit Assistant (Any Confidence) | • At least 10 predicted issues in Benchmark Dataset 2 | • For Benchmark Dataset 2 predictions, recall ≥ 95% and precision ≥ 80% | 35 | 6 |
| Audit Assistant (High Confidence) | • At least 10 predicted issues in Benchmark Dataset 2 | • For Benchmark Dataset 2 predictions, recall ≥ 95% and precision ≥ 80% | 15 | 7 (22.5% coverage) |

Figure 7

| Issue Types | % Total Triage Time | Highest Remediation Priority | Automated Triage Method |
|---|---|---|---|
| Cross-Site Request Forgery (CSRF) | 9.1 | Low | |
| Null Dereference | 4.5 | High | |
| Insecure Randomness | 4.0 | High | |
| JavaScript Hijacking: Vulnerable Framework | 3.9 | Low | |
| Path Manipulation | 3.7 | Critical | Programmed Rule |
| Poor Error Handling: Overly Broad Catch | 3.4 | Low | |
| Access Control: Database | 2.5 | High | |
| System Information Leak: External | 2.4 | Low | |
| SQL Injection | 2.4 | Critical | Audit Assistant (high) |
| Weak XML Schema: Unbounded Occurrences | 2.3 | High | Blanket Exploitable |
| Password Management: Password in Comment | 2.3 | Low | Filter |
| Cross-Site Scripting: Reflected | 2.2 | Critical | Machine Learning |
| ASP.NET Misconfiguration: Debug Information | 2.2 | Medium | Blanket Exploitable |
| Resource Injection | 2.1 | Low | |
| Password Management: Password in Configuration File | 2.0 | High | Programmed Rule |
| Unreleased Resource: Database | 1.9 | High | |
| System Information Leak: Internal | 1.9 | Low | Audit Assistant (high) |
| Poor Error Handling: Empty Catch Block | 1.8 | Low | |
| Open Redirect | 1.7 | Critical | Audit Assistant (any) |
| Dynamic Code Evaluation: Code Injection | 1.7 | Critical | Audit Assistant (any) |
| Cross-Site Scripting: Document Object Model (DOM) | 1.7 | Critical | |
| Denial of Service (DOS) | 1.6 | Low | |
| Log Forging | 1.6 | High | Machine Learning |
| Unreleased Resource: Unmanaged Object | 1.5 | High | |
| Insecure Transport: Database | 1.4 | Critical | Blanket Exploitable |

Figure 8(a)

| Issue Types | % Total Triage Time | Highest Remediation Priority | Automated Triage Method |
|---|---|---|---|
| HTMLS: MIME Sniffing | 1.4 | Medium | Blanket Exploitable |
| Weak Cryptographic Hash | 1.3 | Low | |
| Cookie Security: HTTPOnly not set on Application Cookie | 1.2 | Low | Blanket Exploitable |
| Privacy Violation: Heap Inspection | 1.2 | High | Machine Learning |
| Weak XML Schema: Lax Processing | 1.1 | High | Blanket Exploitable |
| JavaScript Hijacking | 1.1 | Low | |
| Portability Flaw: File Separator | 1.0 | High | |
| JSON Injection | 1.0 | Critical | |
| Hidden Field | 0.9 | Low | Blanket Exploitable |
| Poor Logging Practice: Use of a System Output Stream | 0.9 | Low | |
| Key Management: Hardcoded Encryption Key | 0.9 | Critical | |
| Server-Side Request Forgery | 0.9 | High | Audio Assistant (high) |
| Weak XML Schema: Type Any | 0.9 | High | |
| Password Management: Hardcoded Password | 0.9 | Critical | |
| Weak Cryptographic Hash: Insecure Password-based encryption (PBE) Iteration Count | 0.8 | Medium | |
| Often Misused: File Upload | 0.8 | Medium | |
| XML External Entity Injection | 0.7 | Critical | |
| Hardcoded Domain in HTML | 0.6 | Low | |
| Code Correctness: Erroneous Class Compare | 0.6 | Low | |
| Command Injection | 0.6 | Critical | |
| Dead Code: Unused Method | 0.6 | Low | Filter |
| Password Management: Empty Password | 0.6 | High | |
| Setting Manipulation | 0.6 | Low | |
| Mass Assignment: Insecure Binder Configuration | 0.5 | High | |
| Trust Boundary Violation | 0.5 | Low | |

Figure 8(b)

SYSTEMS AND METHODS FOR TRIAGING SOFTWARE VULNERABILITIES

CROSS-REFERENCE TO RELATED APPLICATION

This application claims benefit to U.S. Provisional Patent Application No. 62/940,941, filed on Nov. 27, 2019, the entirety of which is incorporated by reference herein.

FIELD OF THE INVENTION

The present disclosure relates in general to the field of software security, and in particular methods and systems for scanning and remedying security vulnerabilities in software applications during their development.

BACKGROUND

During the development of software and applications, the procedure of scanning, analysis and remediation for security vulnerabilities are typically slow and manual. Basic techniques and tools in the art are known to scan and identify for vulnerabilities. However, experts are required to interpret the results, highlight the most relevant vulnerabilities, and suggest fixes. This usually takes a substantial amount of time, and such cybersecurity experts are in short supply. Software developers desire a faster process that can scale to meet demand, and maintain the quality of an expert analysis. Advanced triage and remediation processes and intelligence are desired to more efficiently and effectively scan software applications during their development stage.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

FIG. 7 is a chart illustrating examples of automated triage methods for implementing an exemplary system, in accordance with certain embodiments of the present disclosure.

FIGS. 8(a)-(b) are charts illustrating examples of scan results implemented by an exemplary system, in accordance with certain embodiments of the present disclosure.

DETAILED DESCRIPTION OF EMBODIMENTS OF THE INVENTION

Reference will now be made in detail to the embodiments of the present disclosure, examples of which are illustrated in the accompanying drawings.

The present disclosure may be embodied in various forms, including a system, a method, a computer readable medium, or a platform-as-a-service (PaaS) product for scanning and rectifying security vulnerabilities in software applications. In some examples, a technical advantage of the disclosures described herein may include the identification of security vulnerabilities in software applications scanned during their development stage. Another technical advantage may be the reduction of false positives and duplicates in the scan results. Yet another technical advantage may be the analysis of vulnerability root causes. Another technical advantage may include providing additional information to human security analyst to reduce their scope of analysis to increase their efficiency. Technical advantages may include the classification of identified security vulnerabilities, and their automated triage based on machine learning. In certain examples, a technical advantage may include the translation or interpretation of the scan results to determine a remediation of the security vulnerabilities identified by the scan. In an example, a technical advantage may include the presentation of recommendations to software developers via a user interface or scan report in order to enable the secure development of a software application. Accordingly, an exemplary benefit of the present disclosures may include a reduction in time for security analysts to assess vulnerabilities, and an improved confidence in the security of the software application being developed. While inefficient technologies exist that provide security analysts with basic scan results that detect vulnerabilities, a technical advantage of the present disclosures may include an assessment of the scan results and a determination of actual vulnerabilities versus false positives.

Figure 1:
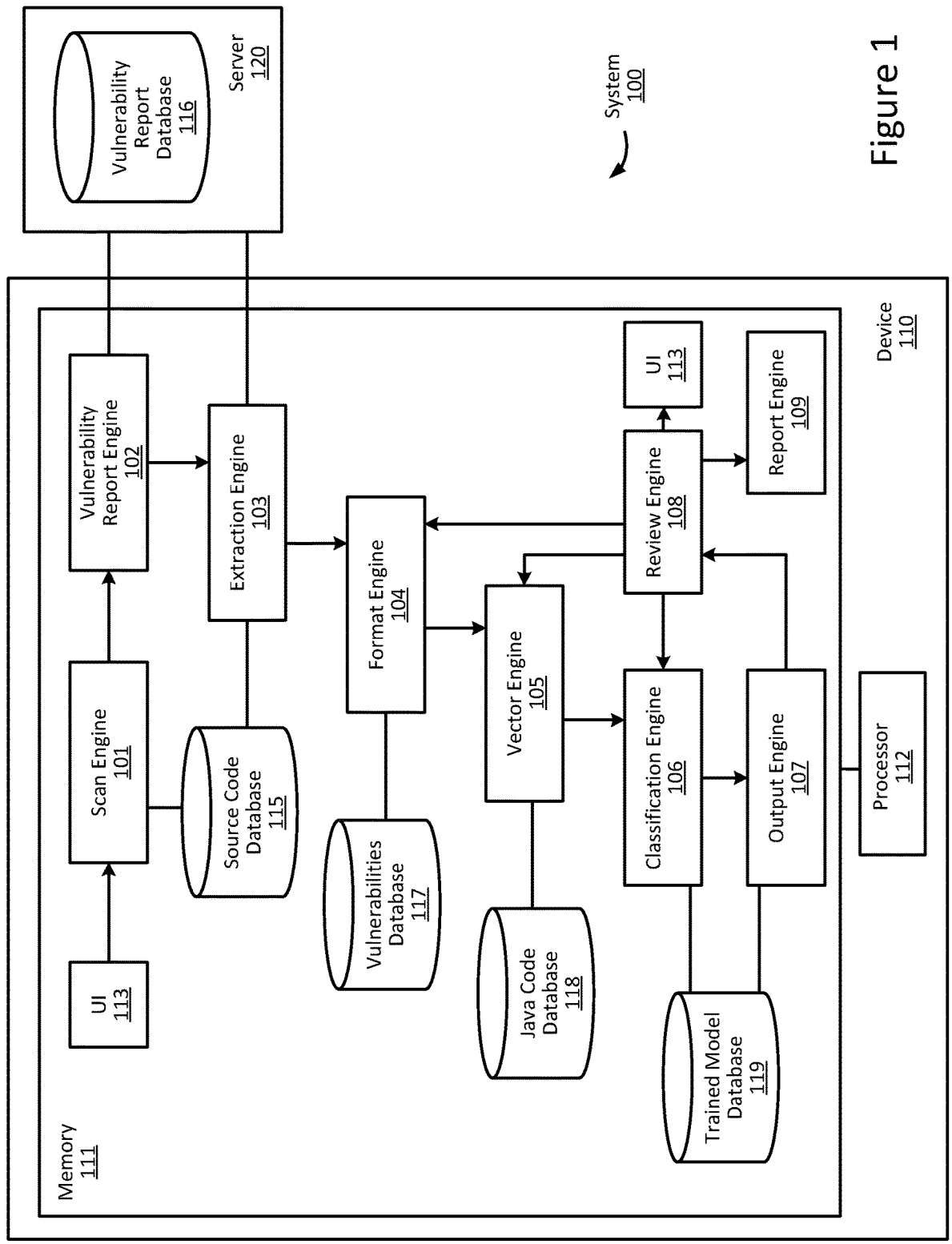
FIG. 1 is a block diagram illustrating an example of an architecture for an exemplary system, in accordance with certain embodiments of the present disclosure.

FIG. 1 illustrates an embodiment of such a system 100 that may be implemented in many different ways, using various components and modules, including any combination of circuitry described herein, such as hardware, software, middleware, application program interfaces (APIs), and/or other components for implementing the features of the circuitry. The system 100 may include a scan engine 101, a vulnerability report engine 102, an extraction engine 103, a format engine 104, a vector engine 105, a classification engine 106, an output engine 107, a review engine 108, and/or a report engine 109. In an embodiment, the steps of the disclosed methods may be implemented by these engines 101-109.

Figure 2:
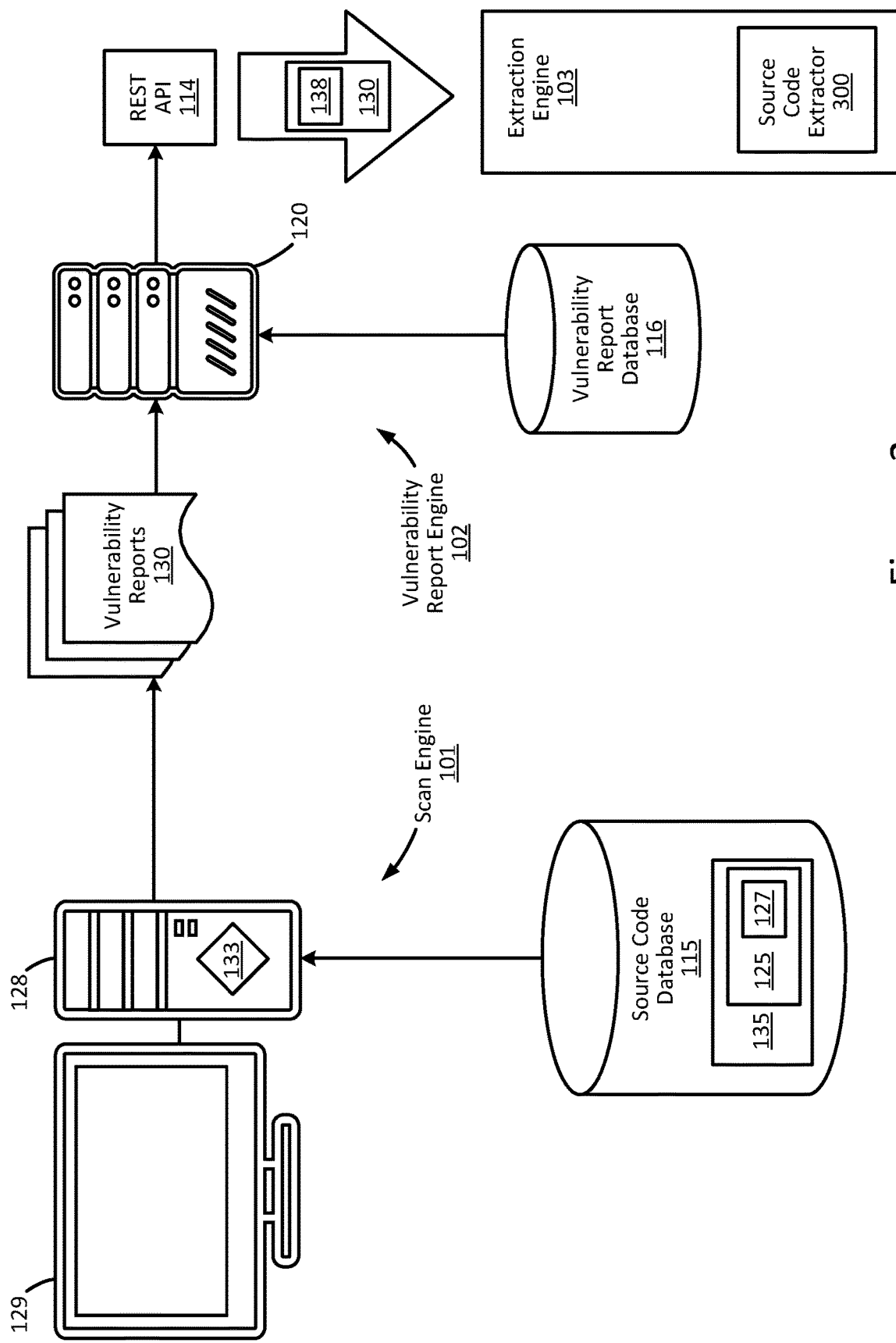
FIG. 2 is a block diagram illustrating an embodiment of a scan engine and a vulnerability report engine for implementing the exemplary system depicted in FIG. 1, in accordance with certain embodiments of the present disclosure.

In an embodiment, the system 100 may include a computing device 110, which may include a memory 111 and a processor 112. The system 100 may also include generated user interfaces (UIs) 113, and Representational State Transfer (REST) APIs 114 as shown in FIG. 2, that may be adapted to enable communication between components, modules and databases. As discussed below, users may interface with the system 100 via the UIs 113. In some embodiments, the memory 111 may include the components and modules of the system 100, including the aforementioned engines 101-109, the UIs 113, and the REST APIs 114. The system 100 may also include a source code database 115, a vulnerability report database 116, a security vulnerability database 117, a java code repository or database 118, and/or a trained model database 119. Further, the system 100 may include a software-security server 120 and a router.

The computing device 110, the databases 115-119, the software-security server 120 and the router may be logically and physically organized in many different ways, in accordance with certain embodiments of the present disclosures. The databases 115-119 may be implemented with different types of data structures (such as linked lists, hash tables, or implicit storage mechanisms), and may include relational databases and/or object-relational databases. The databases 115-119 may be stored in the memory 111 of the device 110 and/or the software-security server 120, or they may be distributed across multiple devices, servers, processing systems, or repositories. For example, the vulnerability report database 116 may be configured to communicate with the software-security server 120, and the vulnerability report engine 102 and the extraction engine 103 may be configured to communicate with the software-security server 120. In certain embodiments, the computing device 110 may include communication interfaces, display circuitry, and input/output (I/O) interface circuitry that may be controlled by the processor 112 in order to perform the process steps discussed below via the components and modules illustrated in FIG. 1. As discussed below, users may interface with the system 100 via the UIs 113 displayed by the display circuitry.

FIG. 2 illustrates an embodiment of a scan engine 101 configured to scan source code 125 stored in a source code database 115. In an embodiment, the computing device 110 may include system circuitry that may implement any desired functionality of the system 100. As discussed below, in some embodiments, the scan engine 101 may be configured to scan source code 125 for security vulnerabilities 127. For example, the scan engine 101 may be implemented on an application-scanning client 128, as further discussed below, that may be configured to communicate with a source code database 115 that stores source code 125 to be scanned by the system 100. In an embodiment, the application-scanning client 128 may comprise a computing device 110. Alternatively, the source code database 115 may be implemented on the computing device 110, which may be configured to communicate with an application-scanning client 128 implemented on another device that may be adapted to communicate with a display 129. In some embodiment, as shown in FIG. 2, the scan engine 101 may be further configured to generate vulnerability reports 130, and transmit the vulnerability reports 130 to the vulnerability report engine 102.

In certain embodiments, as an initial step of the disclosed methods, the scan engine 101 may receive a scan request to scan source code 125. In some embodiments, this may be the initial stage of the process where a client or user requests an analysis of source code 125 for the detection of security vulnerabilities or threats 127 within, or related to, the source code 125. In an example, this initial analysis may be performed by the system 100 in conjunction with a code analyzer 133. In certain embodiments, the code analyzer 133 in the scan engine 101 may be implemented by commercial packages or open source solutions. For example, the code analyzer 133 may include scanning tools such as Veracode, HCL App Scan, Checkmarx, and/or Fortify. Generally, the code analyzer 133 attempts to protect systems from security flaws in business-critical software applications through the use of vulnerability reports 130. The code analyzer 133 may scan source code 125 of a software product or application 135, and generate vulnerability reports 130. In certain embodiments, the vulnerability report engine 102 may generate vulnerability report 130.

In some embodiments, source code 125 for an application 135 that is selected, received and/or identified by a client 132 may be stored within the source code database 115. This may include the source code 125 that the client 132 requests to be assessed or analyzed in order to determine if the source code 125 includes security vulnerabilities 127 that could be deemed as exploitable by a security analyst. In an embodiment, the source code 125 may be pushed or transmitted to an application-scanning client 128. The application-scanning client 128 may include static application security testing software. In certain embodiments, a user or a client 132 may enter, input, submit or transmit source code 125 of a software application 135 to the application-scanning client 128.

The application-scanning client 128 may generate vulnerability reports 130 that correspond to the scan of source code 125. Typically, a security analyst 136 may spend an extended period of time reviewing such a file 134 via the application-scanning client 128 in order to determine source code 125 that may be a security vulnerability/threat 127, and to determine false positives that may be ignored. The vulnerability reports 130 may be stored in the software-security server 120. An vulnerability report 130 may include scan project code used by the code analyzer 133, which may include a suite of tools used by security professionals to scan enterprise software for security issues. In some embodiments, the vulnerability reports 130 may be stored in the vulnerability report database 116, which may include a relational database service (RDS). Vulnerability reports 130 that are stored in the vulnerability report database 116 may be transmitted to the software-security server 120. In an embodiment, the software-security server 120 may be configured to transmit the vulnerability reports 130 to the extraction engine 103 via a REST API 114, as denoted by the large arrow between the vulnerability report engine 102 and the extraction engine 103 shown in FIG. 2.

Figure 3:
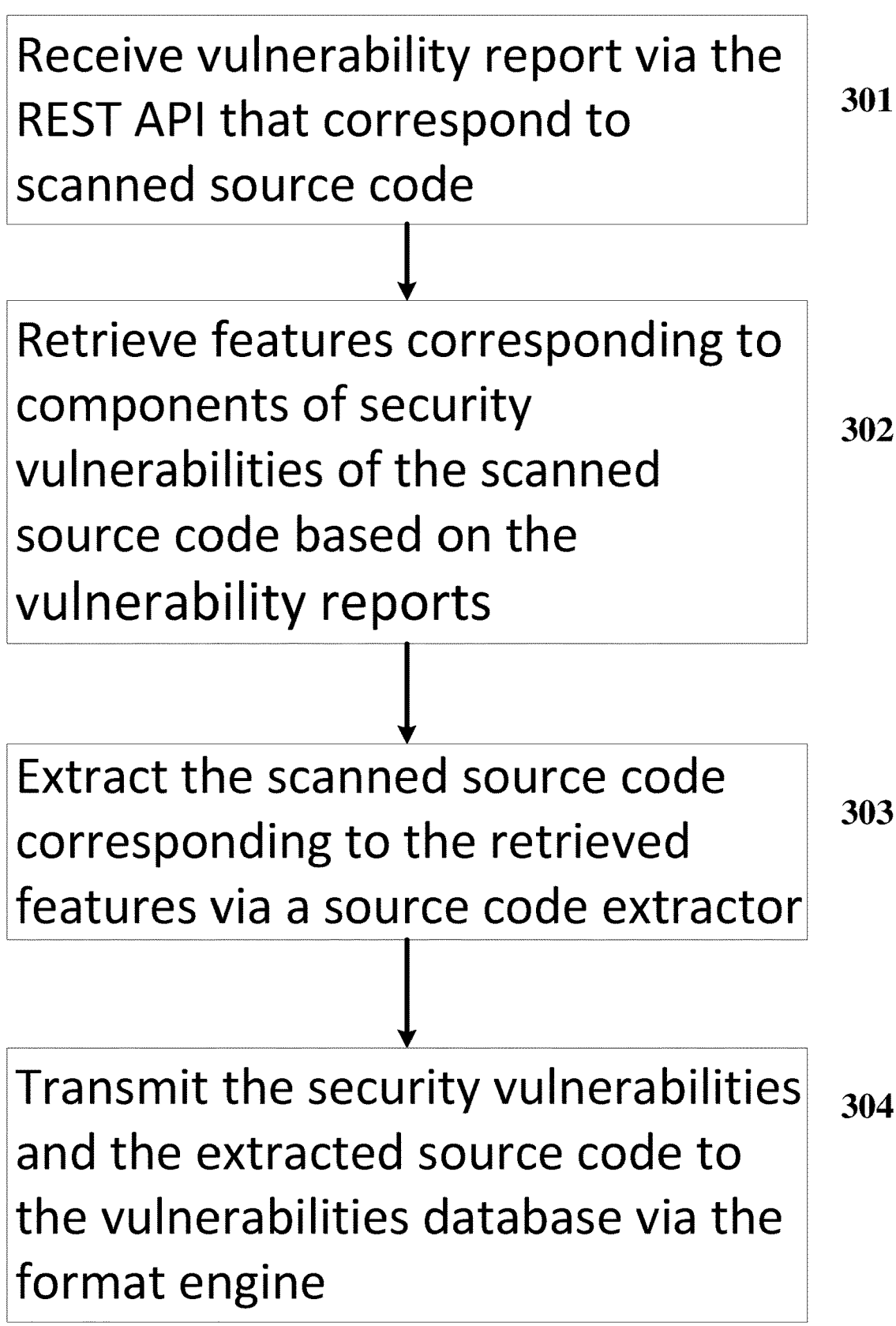
FIG. 3 is a flow diagram illustrating an example of a method implemented by an exemplary extraction engine for implementing the system depicted in FIG. 1, in accordance with certain embodiments of the present disclosure.

FIG. 3 illustrates an embodiment of a feature extraction process implemented by the extraction engine 103, which may be configured to communicate with the software-security server 120. The feature extraction process of the disclosed methods may include the extraction of features 138 from vulnerability reports 130 that indicate whether a part of the source code 125 may be vulnerable or not based on the vulnerability reports 130 generated by the code analyzer 133, and the transmission of the features 138 to the format engine 104. This process may include the initial step of receiving (block 301) vulnerability reports 130 from the software-security server 120 via the REST API 114. Features 138 may be retrieved (block 302) that comprise different components of security vulnerabilities 127. In certain embodiments, such retrieved features 138 may identify the relevant threat of the security vulnerabilities 127 of the source code 125 based on the corresponding vulnerability reports 130.

The feature extraction process may also include the step of source code extraction. See block 303. This step may be performed by a source code extractor 300, as shown in FIG. 2, which extracts original source code 125 from the application 135 that was scanned and/or tested. See block 303 in FIG. 3. The extracted source code 125 may comprise the code 125 corresponding to the retrieved features 138. As such, the source code extractor 300 may be configured to communicate with the source code database 115, either directly or indirectly as shown in FIG. 2. In addition, the process may include the step of pushing or transmitting (block 304 in FIG. 3) security vulnerabilities 127 of the extracted source code 125 to the vulnerabilities database 117. This transfer may be performed via the format engine 104. Accordingly, all of the security vulnerabilities 127 may be detected by the code analyzer 133 and the source code 125 may be transmitted to, and stored, in the vulnerabilities database 117 for further processing by the system 100.

In an embodiment, the format engine 104 may format the security vulnerabilities 127 received from the source code extractor 300 of the extraction engine 103 into a format configured to be received by the vulnerabilities database 117. In an example, the received security vulnerabilities 127 may be stored in a format compatible with, or usable by, the system 100. The format engine 104 may store all the security vulnerabilities 127 that were identified by the code analyzer 133, and received from the extraction engine 103, in a format adapted to enable conversion of the security vulnerabilities 127 by the system 100. The format may be readable by the system 100. In this format, the cleaned or reformatted vulnerabilities 127 may be analyzed via analytics experiments performed by the system 100. The cleaned vulnerabilities 127 stored in the vulnerabilities database 117 may be adapted for further conversion by the system 100. In certain embodiments, the vulnerabilities database 117 may be adapted to transmit the cleaned security vulnerabilities 127 to the vector engine 105.

Figure 4:
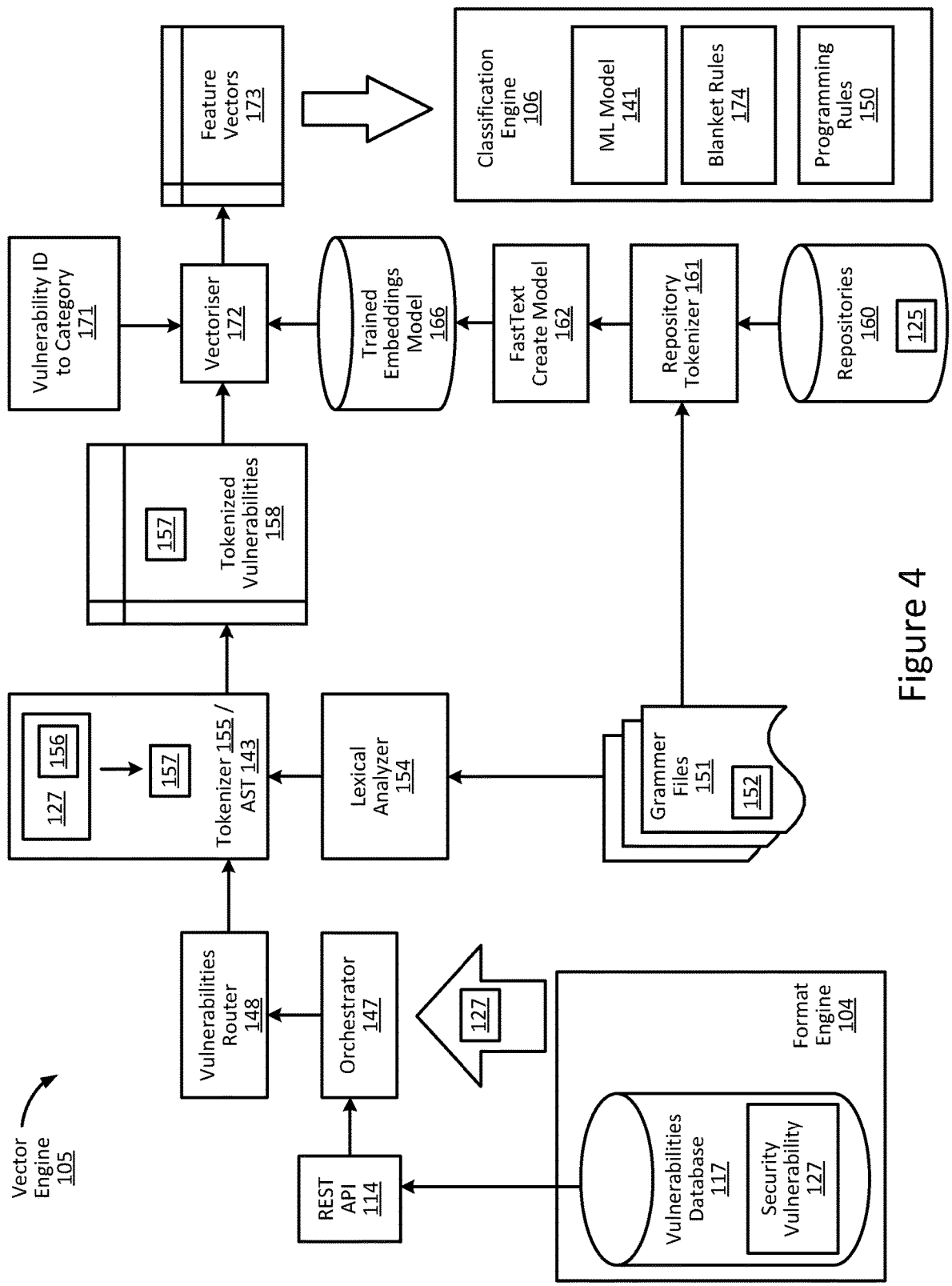
FIG. 4 is a block diagram illustrating an embodiment of a format engine and a vector engine for implementing the exemplary system depicted in FIG. 1, in accordance with certain embodiments of the present disclosure.

FIG. 4 illustrates an example of a vector engine 105, and its interactions with the components of other engines 104 and 106 as denoted by the large arrows between the engines. The vector engine 105 may be configured to create feature vectors 173 for training machine learning (ML) models 141 in order to predict or determine if a security vulnerability 127 is actually a threat. The cleaned security vulnerabilities 127 may be converted from human readable features 138 into a format that can be processed by a machine learning model 141. In some embodiments, abstract syntax trees (AST) may be utilized as a method of breaking down the data for the cleaned security vulnerabilities 127 into a format that can be processed by a machine learning model 141. In an embodiment, as discussed below, the tokenizer 155 in the vectorising process may be substituted with ASTs 143. A syntax tree 143 may comprise a tree representation of the abstract syntactic structure of source code 125 written in a programming language. Each node of the tree 143 may denote a construct occurring in the source code 125.

As shown in FIG. 4, an orchestrator 147 of a vector engine 105 may receive cleaned vulnerabilities 127 from the format engine 104. In some embodiments, the vulnerabilities database 117 may be configured to transfer cleaned security vulnerabilities 127 to the orchestrator 147 via an REST API 114. A vulnerability router 148 may be configured to communicate with the orchestrator 147. The vulnerability router 148 may scan the list of cleaned vulnerabilities 127, and classify each cleaned vulnerability 127 based on the type of security vulnerability 127 to which it corresponds. Based on the determined type of vulnerability 127 for a classified vulnerability 127, the classified vulnerability 127 may be routed in the system 100 based on predetermined machine learning rules or programming rules.

In certain embodiments, the vector engine 105 may include grammar files 151 that may define speech-to-text words, terms and phrases 152 which a grammar engine may recognize on a user device 110. Grammar files 151 may comprise .py, .java, .js, .cs, and/or .xml files. In an embodiment, the terms 152 listed in the grammar file 151 may be those for which the grammar engine searches and compares against verbal responses. When the grammar engine finds a matching term 152, the grammar engine may execute an associated command or enter the term 152 into a field. A lexical analyzer 154 may receive a grammar file 151 and vulnerability features 138, and perform tokenization via a tokenizer 155 in order to return features 138 in accordance with certain embodiments.

The tokenizer 155 may perform lexical analysis, lexing or tokenization. This may include the process of converting a sequence of characters 156 for the cleaned vulnerability 127 into a sequence of tokens 157. Tokenized vulnerability features 158 may include vulnerabilities 127 stored in memory 111 in tokenized format, which may comprise such a sequence of tokens 157. The repositories 160 may be selected where the targeted source code 125 may be hosted. In an embodiment, the repositories 160 may be selected based on their size. The hosted code 125 may be transmitted to a tokenizer 161, which may include a tool for language recognition. This tokenizer 161 may tokenize the repositories 160 and generate tokens 157.

In some embodiments, the vector engine 105 may include a FastText create model 162, which may include a library for learning of word embeddings and text classification. The FastText create model 162 may receive tokens 157 and generate a trained embedding model 166. The trained embeddings model 166 may include an embedding, which may include a mapping of a discrete, categorical variable to a vector of continuous numbers. In certain embodiments, each cleaned vulnerability 127 may be mapped to a vulnerability category 170 in order to generate a vulnerability ID 171 for each cleaned vulnerability 127 mapped to a category 170. In certain embodiments, a vectorizer 172 may receive the tokenized vulnerability features 158 as input, and may output a single feature vector 173. The feature vectors 173 may include all of the output collected from the vectorizer 172. Furthermore, a feature vector can include a link to a source code tree, where relevant source code can be obtained. These feature vectors 173 may be transmitted to the classification engine 106.

Figure 5:
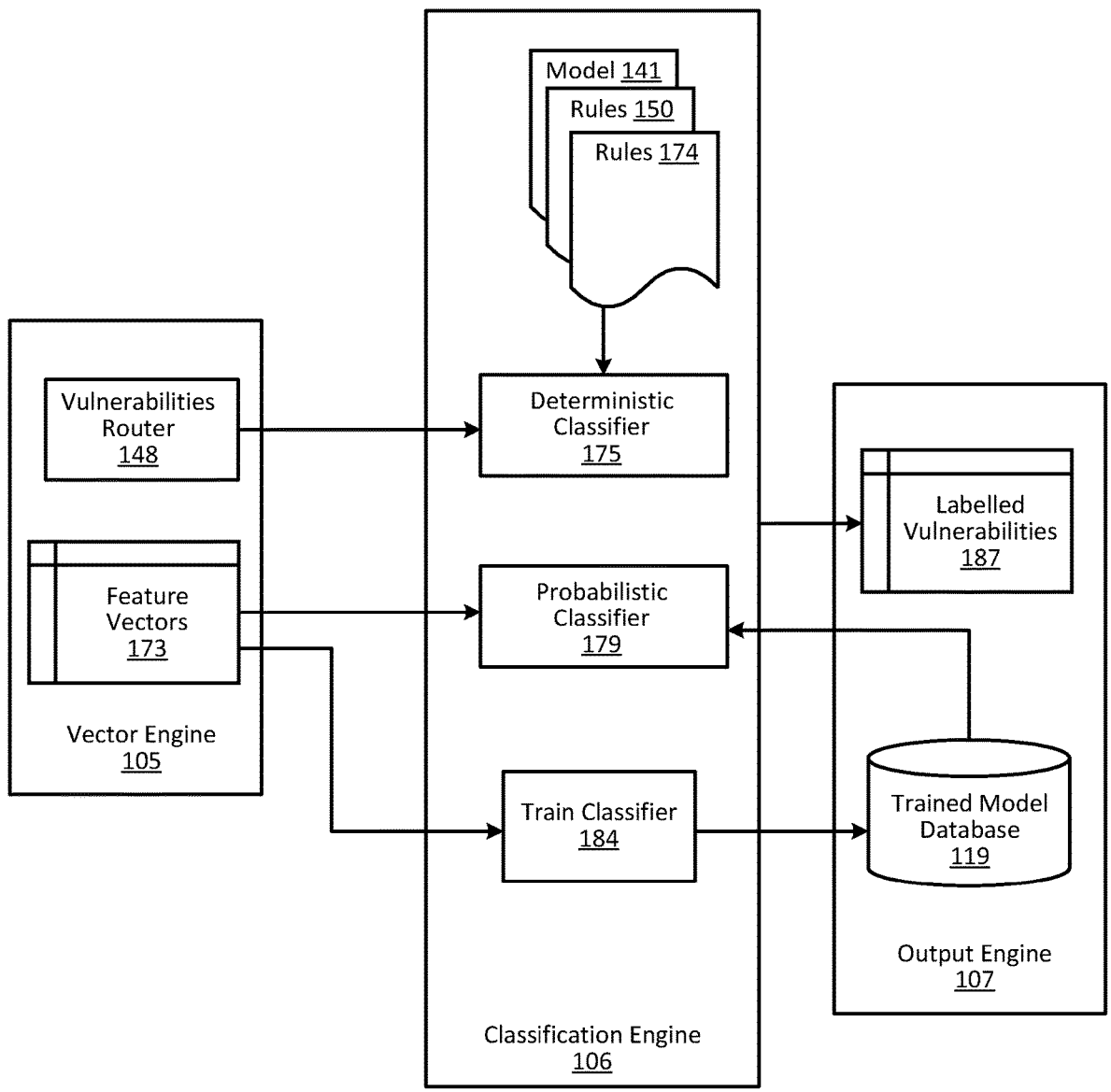
FIG. 5 is a block diagram illustrating an embodiment of components for a vector engine, a classification engine and an output engine for implementing the exemplary system depicted in FIG. 1, in accordance with certain embodiments of the present disclosure.

FIG. 5 illustrates an embodiment of a classification engine 106, and its interactions with the components of other engines 105 and 107, in accordance with certain embodiments of the disclosed systems 101. The feature vectors 173 may be utilized as input to the pre-trained ML model 141, predetermined programming rules 150 and/or blanket rules 174 in order to determine whether the cleaned vulnerability 127 is a threat or not. The classification engine 106 may determine whether a vulnerability 127 is a threat or not through at least three different methods: blanket rules 174, programming rules 150 and/or ML models 141. The blanket rules 174 and programming rules 150 may be applied to automated triaging methods configured to automate the triaging of the vulnerabilities 127. In certain embodiments, blanket rules 174 may be applied to vulnerabilities 127 routed through the vulnerability router 148, and the ML model 141 may not be required. Such a vulnerability 127 may be selected based on historical data that consistently indicates that the vulnerability 127 is exploitable. As such, it may be reasonable to automatically assume that the identified vulnerability 127 may be exploitable again. In some embodiments, programming rules 150 may be applied to the vulnerabilities 127 transmitted from the vulnerability router 148. The programming rules 150 may scan a vulnerability 127 in order to detect common patterns that have been identified as a threat. In an embodiment, an AST 143 may be processed by the system 100 but may be removed when converted. The classification engine 106 may also utilize machine learning. A vulnerability 127 may be processed by the system 100 (e.g., tokenized and vectorized) and the feature vectors 173 may be transmitted or inputted into the pre-trained model 141, which may have previously analyzed such feature vectors 173. As more vulnerabilities 127 may be converted into feature vectors 173, the system 100 may more often utilize the ML model 141 because the pre-trained model 141 may be more likely to have already determined whether the specific vulnerability 127 is exploitable.

The exemplary classification engine 106 shown in FIG. 5 may determine whether a vulnerability 127 is a threat or not. The classification engine 106 may include a deterministic classifier 175, which may implement a classifying algorithm whose resulting behavior may be determined by its initial state and inputs. In an embodiment, the deterministic classifier 175 may not be random or stochastic. The classification engine 106 may also include a probabilistic classifier 179, which may include a classifier configured to predict a probability distribution over a set of classes. In an embodiment, the probabilistic classifier 179 may be based on an observation of an input, rather than only outputting the most likely class to which the observation may belong. In addition, the classification engine 106 may include a train classifier 184, which may be configured to be trained based on the feature vectors 173. In some embodiments, the train classifier 184 may be configured to train the deterministic classifier 175 and/or the probabilistic classifier 179. In certain embodiments, the train classifier 184 may be configured to train the trained model 141. Accordingly, the train classifier 184 may be adapted to communicate with the trained model 141, which may be included in the output engine 107. Rules (e.g., blanket rules 174) may be transferred to the deterministic classifier 175 as a set of rules. For example, blanket rules 174 may be implemented if the source code 125 is identifiable as being a threat based on historical data that consistently indicates that the vulnerability 127 is exploitable.

An embodiment of the output engine 107 is also in FIG. 5. The output from the output engine 107 may include initial findings received from the trained model 141 for the predictions of whether labelled vulnerabilities 187 are a threat or not. The trained model 141 may be stored in the trained model database 119. In some embodiments, the trained model 141 may be transmitted to the probabilistic classifier 179. The classification engine 106 may generate a list of labelled vulnerabilities 187, and/or predictions thereof, that may be stored and later reviewed by the system 100.

Figure 6:
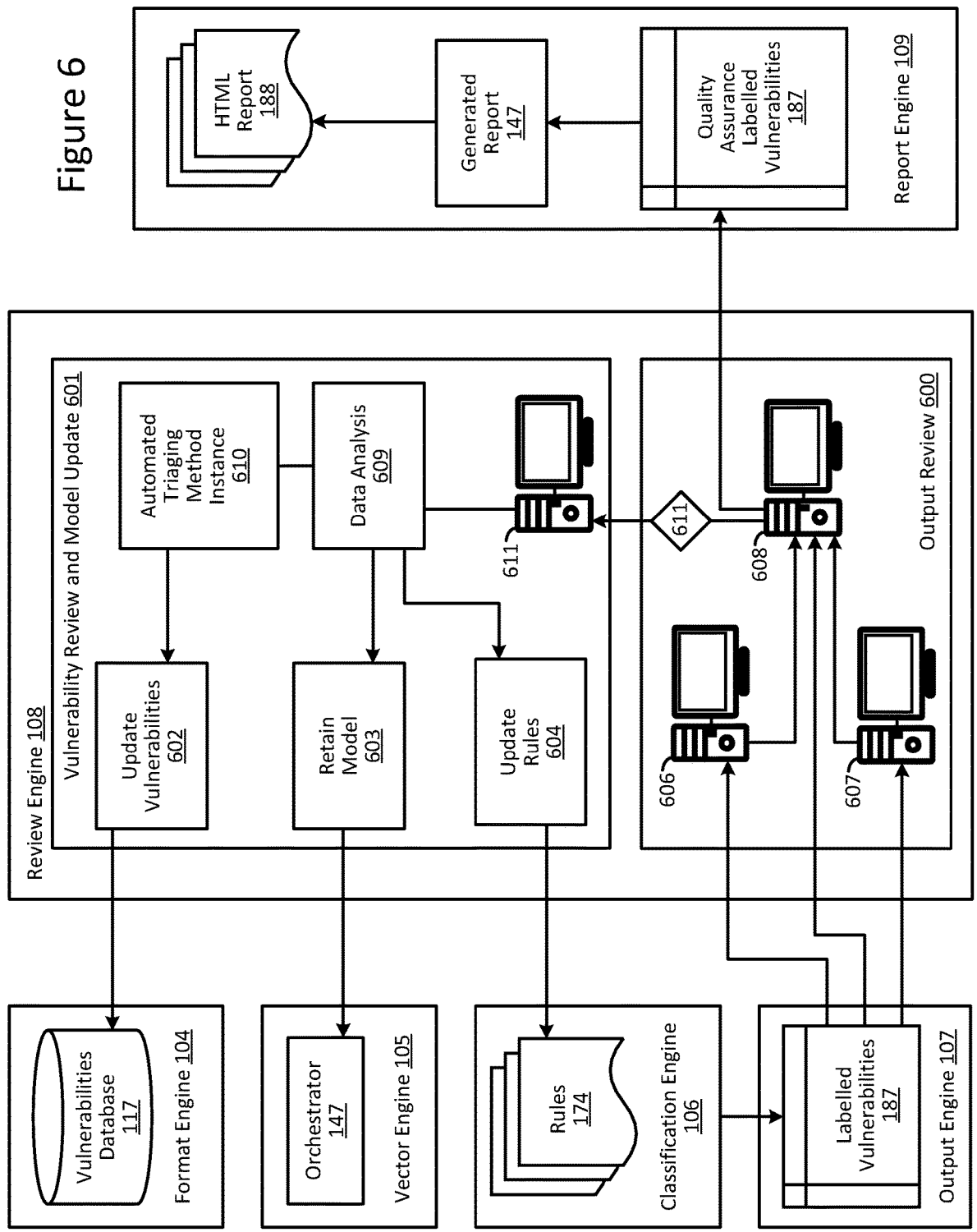
FIG. 6 is a block diagram illustrating an embodiment of components for various engines for implementing the exemplary system depicted in FIG. 1, in accordance with certain embodiments of the present disclosure.

FIG. 6 illustrates an embodiment of the review engine 108, its interactions with the components of other engines 104-107 and 109, and exemplary processes implemented by the review engine 108. For example, the review engine 108 may be implemented to include a process for an output review (block 600) and a process for a vulnerability review and a model update (block 601). Through these processes, the review engine 108 may review the vulnerabilities 127 that the system 101 determined as being exploitable, and may use such vulnerabilities 127 to retrain the model 141 for future usage. This review may be transmitted back into the model 141 in order to further train the model 141.

The vulnerability review and model update process 601 may include the steps of updating vulnerabilities (block 602), retaining a model (block 603), and updating rules (block 604). This process may be configured to update the vulnerabilities database 117 with vulnerabilities 127 determined to be exploitable for the blanket rules 174. The updated vulnerabilities 127 may be transmitted back to the vulnerabilities database 117, which may store the cleaned vulnerabilities 127 in the format compatible with the system 100. In order to retrain the model 141, findings may be received from a security analyst (SA) review 606, a data scientist (DS) review 607, and/or a quality assurance (QA) review 608, and a data analysis 609 may be performed. Such findings received from the data analysis 609 may be transmitted to the orchestrator 147 of the vector engine 105. The findings may be utilized to update the blanket rules 174, the model 141 and the list of vulnerabilities 127.

The updated blanket rules 174 may include rules updated by the findings received from the reviews 606-608 and the data analysis 609. These reviews 606-608 may be performed by a data scientist and/or a security analyst. The data analysis 609 may be performed on new data in order to determine an optimal method for updating the blanket rules 174 and retraining the model 141. An automated triaging method instance 610 may be configure to automate the triaging of vulnerabilities 127. The vulnerability review and model update process 601 may be based on the combination of the review results 611 received from the security analyst review 606, the data scientist review 607, and/or the quality assurance review 608. The review results 611 may be transmitted to the report engine 109.

The report engine 109 may be configured to receive the review results 611 from the review engine 108. A full report may be generated that may include all the vulnerabilities 127 that are actually a threat, as analyzed by a quality assurance review 608. Quality Assurance Labelled Vulnerabilities 187 may be generated to include the vulnerabilities 127 that have passed through the system 100 and assessed by the Quality Assurance review 608. This review 608 may be performed by a quality assurance expert. A final report 147 may be generated for a client 132, and a HTML Report 188 may be generated to report all of the findings in a HTML format.

The final report 147 and the HTML Report 188 may be displayed via a device 110. The UIs 113 may be displayed locally using the display circuitry, or for remote visualization, e.g., as HTML, JavaScript, audio, and video output for a web browser that may be run on a local or remote machine. The UIs 113 and the I/O interface circuitry may include touch sensitive displays, voice or facial recognition inputs, buttons, switches, speakers and other user interface elements. Additional examples of the I/O interface circuitry includes microphones, video and still image cameras, headset and microphone input/output jacks, Universal Serial Bus (USB) connectors, memory card slots, and other types of inputs. The I/O interface circuitry may further include magnetic or optical media interfaces (e.g., a CDROM or DVD drive), serial and parallel bus interfaces, and keyboard and mouse interfaces.

In an embodiment, the components and modules for an exemplary system may compartmentalized into nine sections: Scan; Store Reports; Extract Features; Store all vulnerabilities in a canonical format; Create feature vectors, and/or abstract syntax trees; Classification; Initial Output; Review vulnerabilities; and, Final output plus Report generation. This listing of compartmentalized sections are not necessary in chronological order.

In an embodiment, the system 100 may include the steps of collecting and using different scan reports. These scan reports may be collected from multiple vendors. The scan reports may include the vulnerability reports 130 received from the code analyzer 133, in combination with reports from other vendors for various types of scans. The automated triaging may include a hybrid methodology. For example, the system 100 may use rules, filters, machine learning in conjunction with various feature vectors in combination. FIG. 7 illustrates examples of automated triage methods. Such methods may be trained and validated on various datasets for assessment purposes. FIGS. 8(a)-(b) illustrates examples of identified issue types and their corresponding percentage of total triage time, the highest remediation priority, and the automated triage method implemented.

Figure 9:
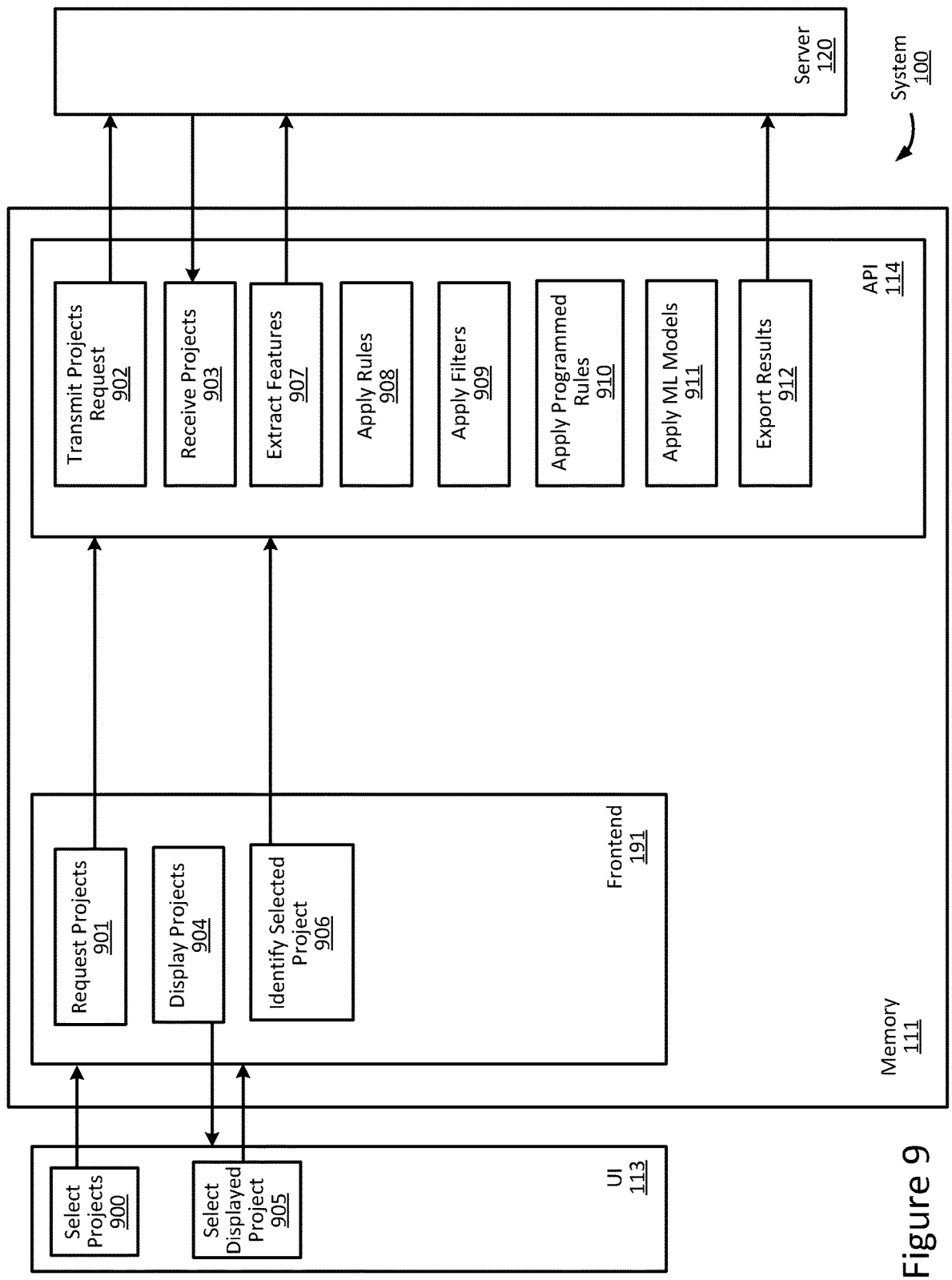
FIG. 9 is a block diagram illustrating an example of a method implemented by an exemplary system, in accordance with certain embodiments of the present disclosure.

In an embodiment, the system 100 may include integration of existing toolchains with custom annotated tags/variables so that automated-FPA files can be integrated back to existing toolchains. For example, the system 100 may be integrated with extract scan results from an application-scanning tool that may be implemented in memory 111 to automatically triage issues and push results back to the application-scanning tool. FIG. 9 illustrates such a system 100, in accordance with certain embodiments. In an embodiment, the system 100 may implement a vulnerability identification prioritization and remediation (ViPR) tool in the memory 111, which may include an integrated repository of data and analysis tools. The system 100 may include a frontend 191 and an API 114. The frontend 191 may communicate with an user, and, the API 114 may communicate with the software-security server 120. Further, the system 100 may combine and use information from scan reports of both Static application security testing (SAST) and Dynamic application security testing (DAST). The system 100 may combine SAST and DAST triage judgements to automatically propose remediation actions in a unified way, e.g. so that one fix may solve both a SAST and DAST issue.

As shown in FIG. 9, the method implemented by the system 100 may include the step of selecting projects via an user interface 113. See block 900. The frontend 191 may request projects (see block 901), and the API 114 may transmit such project requests to the software-security server 120. See block 902. As a result, the APO 114 may receive projects. See block 903. The frontend 191 may be adapted to display the received projects via the user interface 113. See block 904. In some embodiments, one of the displayed projects may be selected via the user interface 113. See block 905. In certain embodiments, the frontend 191 may be identify or determine the selected project. See block 906. The API 114 may be adapted to extract features for the selected project from the software-security server 120. See block 907. In an embodiment, the API 114 may be further adapted to: apply rules (block 908), apply filters (block 909), apply programmed filters (block 910), and/or apply machine learning models (block 911). In addition, the API 114 may be adapted to export results to the software-security server 120, in accordance with certain embodiments. See block 912.

In some embodiments, the communication interfaces may include wireless transmitters and receivers (herein, "transceivers") and any antennas used by the transmit-and-receive circuitry of the transceivers. The transceivers and antennas may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces may also include serial interfaces, such as universal serial bus (USB), serial ATA, IEEE 1394, lighting port, $I^2C$, slimBus, or other serial interfaces. The communication interfaces may also include wireline transceivers to support wired communication protocols. The wireline transceivers may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry may include any combination of hardware, software, firmware, APIs, and/or other circuitry. The system circuitry may be implemented, for example, with one or more systems on a chip (SoC), application specific integrated circuits (ASIC), field programmable gate arrays (FPGA), microprocessors, discrete analog and digital circuits, and other circuitry. The system circuitry may implement any desired functionality of the system 100. As just one example, the system circuitry may include one or more instruction processor 112 and memory 111. The memory 111 may store, for example, control instructions for executing the features of the system 100. In one implementation, the processor 112 may execute the control instructions to carry out any desired functionality for the system 100. Control parameters may provide and specify configuration and operating options for the control instructions and other functionality of the system 100. The system 100 may further include various databases or data sources, each of which may be accessed by the system 100 to obtain data for consideration during any one or more of the processes described herein.

In an embodiment, a method or system 100 for managing software may include the steps of scanning source code of a software product or application 135 to detect potential vulnerability issues, and generating an electronic document report listing detected potential vulnerability issues. The method/system may further include the steps of: extracting features from the electronic document report for each potential vulnerability issue; receiving policy data and business rules; comparing the extracted features relative to the policy data and business rules; and, determining a token based on the source code of a potential vulnerability issue. Further, the method/system may include the steps of: determining a vector based on the extracted features of a potential vulnerability issue and based on the token, and selecting one of a plurality of vulnerability-scoring methods based on the vector. In an embodiment, the vulnerability-scoring methods may be a machine learning modelling 141 method, a blanket-rules 174 automated triaging method, and/or a programming-rules 150 automated triaging method. In accordance with certain embodiments, the plurality of vulnerability-scoring methods may include any combination of such methods. The method/system may also include the steps of determining a vulnerability accuracy score based on the vector using the selected vulnerability-scoring method, and displaying the vulnerability accuracy score to a user. In an embodiment, the plurality of machine learning models may include random forest machine learning models.

Figure 10:
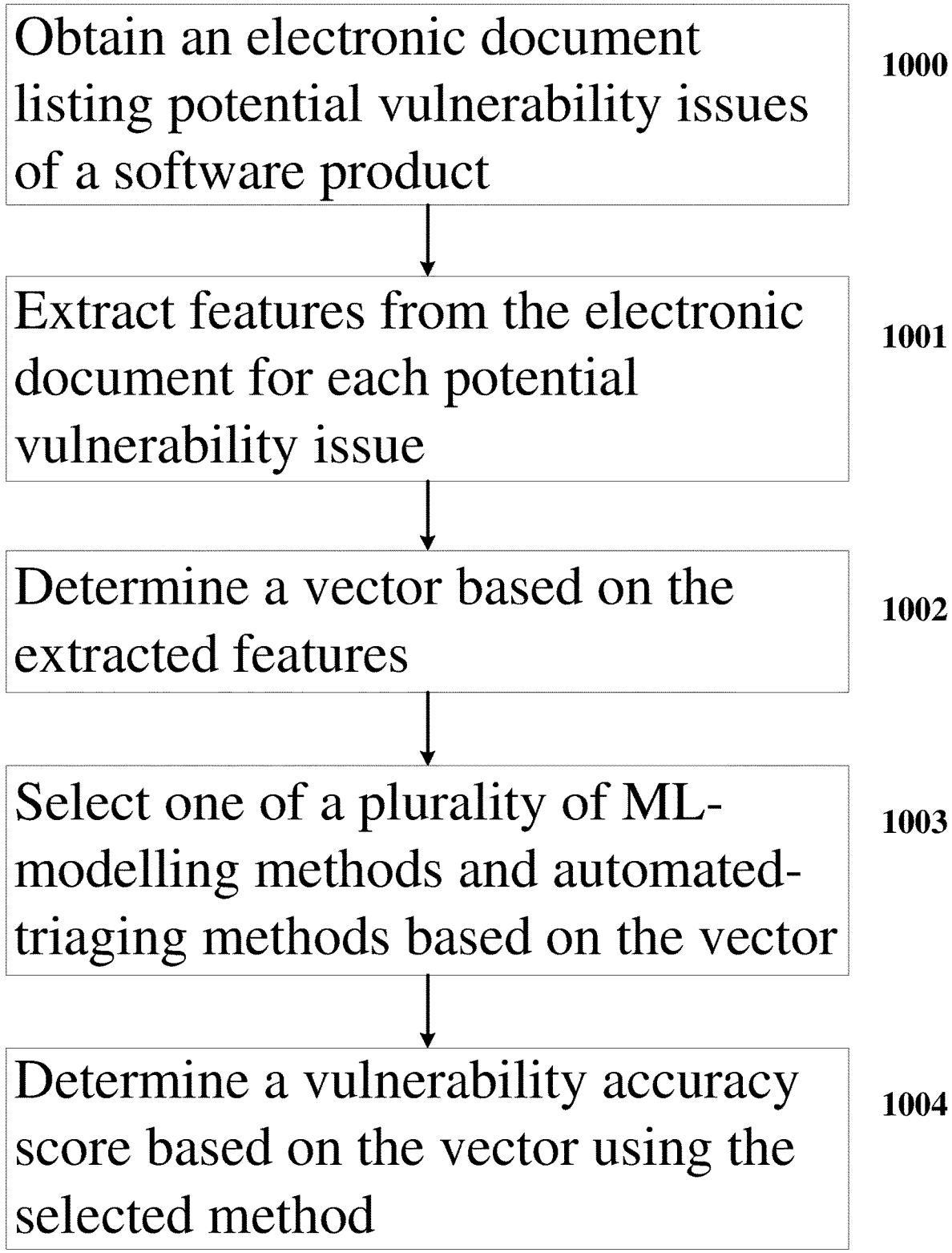
FIG. 10 is a flow diagram illustrating an example of a method implemented by an exemplary system, in accordance with certain embodiments of the present disclosure.

In certain embodiments, as illustrated in FIG. 10, a method or system 100 for managing software may include the steps of: obtaining an electronic document listing potential vulnerability issues of a software product (block 1000); extracting features from the electronic document for each potential vulnerability issue (block 1001); determining a vector based on the extracted features (block 1002); selecting one of a plurality of machine-learning modelling methods and automated-triaging methods based on the vector (block 1003); and determining a vulnerability accuracy score based on the vector using the selected method (block 1004). The method/system may further include the steps of scanning source code of the software product to detect the potential vulnerability issues, and generating the electronic document based on the detected potential vulnerability issues. Further, the method/system may include the steps of: receiving policy data or business rules; comparing the extracted features relative to the policy data or business rules; and, determining a token based on the scanned source code corresponding to at least one of the detected potential vulnerability issues. In some embodiments, the vector may be based on the token. The method/system may also include the step of displaying the vulnerability accuracy score to a user. In an embodiment, the machine learning modelling methods may include random forest machine learning models. In some embodiments, the automated-triaging methods may include blanket-rules automated triaging methods and/or programming-rules automated triaging methods.

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives.

What is claimed is:

1. A system for managing software, comprising:
a memory to store executable instructions; and,
a processor adapted to access the memory, the processor further adapted to execute the executable instructions stored in the memory to:
obtain an electronic document listing potential vulnerability issues of a software product based on a scan of source code;
extract features from the electronic document for each potential vulnerability issue;
receive policy data or business rules;
compare the extracted features relative to the policy data or business rules;
determine a token based on the scanned source code corresponding to at least one of the potential vulnerability issues;
determine a vector based on the extracted features;
select one of a plurality of vulnerability-scoring methods based on the vector, the vulnerability-scoring methods selected from a group consisting of machine learning modelling methods and automated triaging methods; and,
determine a vulnerability accuracy score based on the vector using the selected vulnerability-scoring method.

2. The system of claim 1, wherein the processor is further adapted to:
scan source code of the software product to detect the potential vulnerability issues; and,
generate the electronic document based on the detected potential vulnerability issues.

3. The system of claim 1, wherein the vector is based on the token.

4. The system of claim 1, wherein the processor is further adapted to:
display the vulnerability accuracy score to a user.

5. The system of claim 1, wherein the machine learning modelling methods comprise random forest machine learning models.

6. A system for managing software, comprising:
a memory to store executable instructions; and,
a processor adapted to access the memory, the processor further adapted to execute the executable instructions stored in the memory to:
obtain an electronic document listing potential vulnerability issues of a software product;
extract features from the electronic document for each potential vulnerability issue;
determine a vector based on the extracted features;
select one of a plurality of vulnerability-scoring methods based on the vector, the vulnerability-scoring methods selected from a group consisting of machine learning modelling methods and automated triaging methods; and,
determine a vulnerability accuracy score based on the vector using the selected vulnerability-scoring method,
wherein the automated triaging methods comprise blanket-rules automated triaging methods and programming-rules automated triaging methods.

7. A method for managing software, comprising the steps of:
obtaining an electronic document listing potential vulnerability issues of a software product based on a scan of source code;

extracting features from the electronic document for each potential vulnerability issue;
receiving policy data or business rules;
comparing the extracted features relative to the policy data or business rules;
determining a token based on the scanned source code corresponding to at least one of the potential vulnerability issues;
determining a vector based on the extracted features;
selecting one of a plurality of vulnerability-scoring methods based on the vector, the vulnerability-scoring methods selected from a group consisting of machine learning modelling methods and automated triaging methods; and,
determining a vulnerability accuracy score based on the vector using the selected vulnerability-scoring method.

8. The method of claim 7, further comprising the steps of:
scanning source code of the software product to detect the potential vulnerability issues; and,
generating the electronic document based on the detected potential vulnerability issues.

9. The method of claim 7, wherein the vector is based on the token.

10. The method of claim 7, further comprising the step of:
displaying the vulnerability accuracy score to a user.

11. The method of claim 7, wherein the machine learning modelling methods comprise random forest machine learning models.

12. A method for managing software, comprising the steps of:
obtaining an electronic document listing potential vulnerability issues of a software product;
extracting features from the electronic document for each potential vulnerability issue;
determining a vector based on the extracted features;
selecting one of a plurality of vulnerability-scoring methods based on the vector, the vulnerability-scoring methods selected from a group consisting of machine learning modelling methods and automated triaging methods; and
determining a vulnerability accuracy score based on the vector using the selected vulnerability-scoring method, wherein the plurality of automated triaging methods comprise blanket-rules automated triaging methods and programming-rules automated triaging methods.

13. A non-transitory computer-readable medium including instructions configured to be executed by a processor, wherein the executed instructions are adapted to cause the processor to:
obtain an electronic document listing potential vulnerability issues of a software product based on a scan of source code;
extract features from the electronic document for each potential vulnerability issue;
receive policy data or business rules;
compare the extracted features relative to the policy data or business rules;
determine a token based on the scanned source code corresponding to at least one of the potential vulnerability issues;
determine a vector based on the extracted features;
select one of a plurality of vulnerability-scoring methods based on the vector, the vulnerability-scoring methods selected from a group consisting of machine learning modelling methods and automated triaging methods; and,
determine a vulnerability accuracy score based on the vector using the selected vulnerability-scoring method.

14. The computer-readable medium of claim 13, further comprising executed instructions adapted to cause the processor to:
scan source code of the software product to detect the potential vulnerability issues; and,
generate the electronic document based on the detected potential vulnerability issues.

15. The computer-readable medium of claim 13, wherein the vector is based on the token.

16. The computer-readable medium of claim 13, further comprising executed instructions adapted to cause the processor to:
display the vulnerability accuracy score to a user.

17. A non-transitory computer-readable medium including instructions configured to be executed by a processor, wherein the executed instructions are adapted to cause the processor to:
obtain an electronic document listing potential vulnerability issues of a software product;
extract features from the electronic document for each potential vulnerability issue;
determine a vector based on the extracted features;
select one of a plurality of vulnerability-scoring methods based on the vector, the vulnerability-scoring methods selected from a group consisting of machine learning modelling methods and automated triaging methods; and
determine a vulnerability accuracy score based on the vector using the selected vulnerability-scoring method, wherein the machine learning modelling methods comprise random forest machine learning models, and wherein the automated triaging methods comprise blanket-rules automated triaging methods and programming-rules automated triaging methods.

* * * * *

UNITED STATES PATENT AND TRADEMARK OFFICE
CERTIFICATE OF CORRECTION

| | |
|---|---|
| PATENT NO. | : 11,568,057 B2 |
| APPLICATION NO. | : 16/781160 |
| DATED | : January 31, 2023 |
| INVENTOR(S) | : Sidath Handurukande et al. |

It is certified that error appears in the above-identified patent and that said Letters Patent is hereby corrected as shown below:

In the Claims

Column 13, Claim 12, Line 43, delete "plurality of".

Signed and Sealed this
Eleventh Day of April, 2023

Katherine Kelly Vidal
*Director of the United States Patent and Trademark Office*